US012576350B2

(12) United States Patent
Molina et al.

(10) Patent No.: US 12,576,350 B2
(45) Date of Patent: Mar. 17, 2026

(54) FILTERING GROUP INCLUDING A SPHERICAL VALVE

(71) Applicant: Giacomini S.p.A., San Maurizio d'Opaglio (IT)

(72) Inventors: Samuele Molina, San Maurizio d'Opaglio (IT); Antonio Pistochini, San Maurizio d'Opaglio (IT)

(73) Assignee: Giacomini S.p.A.

( * ) Notice: Subject to any disclaimer, the term of this patent is extended or adjusted under 35 U.S.C. 154(b) by 326 days.

(21) Appl. No.: 18/251,731

(22) PCT Filed: Nov. 25, 2021

(86) PCT No.: PCT/IB2021/060967
§ 371 (c)(1),
(2) Date: May 4, 2023

(87) PCT Pub. No.: WO2022/118147
PCT Pub. Date: Jun. 9, 2022

(65) Prior Publication Data
US 2023/0415078 A1     Dec. 28, 2023

(30) Foreign Application Priority Data

Dec. 4, 2020     (IT) ........................ 102020000029942

(51) Int. Cl.
B01D 35/06          (2006.01)
B01D 29/23          (2006.01)
(Continued)

(52) U.S. Cl.
CPC ............. B01D 35/06 (2013.01); B01D 29/23 (2013.01); B01D 35/157 (2013.01); B01D 35/30 (2013.01);
(Continued)

(58) Field of Classification Search
CPC .............. B01D 35/157; B01D 35/1573; B01D 2201/16; B01D 2201/165
(Continued)

(56) References Cited

U.S. PATENT DOCUMENTS 4,529,515 A      7/1985   Selz
2014/0299806 A1   10/2014   Hoffmann
(Continued)

FOREIGN PATENT DOCUMENTS

CN        111853274 A      10/2020
CN        111853274      *   2/2022   .............. F16K 5/08
(Continued)

OTHER PUBLICATIONS

CN 111853274 (Year: 2022).*
(Continued)

*Primary Examiner* — Benjamin M Kurtz
(74) *Attorney, Agent, or Firm* — Widerman Malek, PL; Mark Malek

(57) ABSTRACT
A filtering group comprising a connection structure having a first input coupling in communication with an input conduit and an output coupling in communication with an output conduit. Further comprising a filter body connected to the connection structure and in fluid communication with the output coupling, and a ball valve housed in the connection structure and configured to assume a first position defined as when the first input coupling is placed in fluid communication with the filter body and a second position defined as when fluid communication between the first input coupling and the filter body is interdicted. The connection structure also includes a second input coupling in communication with the supply line as an alternative to the first input coupling and oriented, with respect to the output coupling, differently from the first input coupling.

13 Claims, 5 Drawing Sheets

(51) Int. Cl.
  *B01D 35/157*    (2006.01)
  *B01D 35/30*    (2006.01)

(52) U.S. Cl.
  CPC .. *B01D 2201/165* (2013.01); *B01D 2201/303* (2013.01)

(58) Field of Classification Search
  USPC ........................................ 210/418, 424, 429
  See application file for complete search history.

(56)            References Cited

U.S. PATENT DOCUMENTS

2018/0030881 A1    2/2018  Carter
2020/0179943 A1    6/2020  Downie et al.

FOREIGN PATENT DOCUMENTS

| | | | | | |
|---|---|---|---|---|---|
| EP | 3332855 | A1 * | 6/2018 | ............. | B01D 35/06 |
| EP | 3332855 | B1 * | 12/2018 | ............. | B01D 35/06 |
| EP | 3449995 | A1 * | 3/2019 | ............... | B03C 1/30 |
| EP | 3468721 | B1 * | 9/2019 | ............... | B04C 9/00 |
| EP | 3449995 | B1 * | 9/2020 | ........... | B03C 1/0332 |
| IT | 201800010004 | A1 | 5/2020 | | |

OTHER PUBLICATIONS

Patent Cooperation Treaty International Search Report, International application No. PCT/IB2021/060967.
Patent Cooperation Treaty Written Opinion of the International Searching Authority, International application No. PCT/IB2021/060967.

* cited by examiner

FILTERING GROUP INCLUDING A SPHERICAL VALVE

RELATED APPLICATIONS

This application is a national phase application of and claims priority under 35 U.S.C. § 371 of PCT Application Serial No. PCT/IB2021/060967 filed on Nov. 25, 2021 and titled FILTERING GROUP INCLUDING A SPHERICAL VALVE which in turn claims priority under Patent Cooperation Treaty Article 8 of Italian Application No. 102020000029942 filed on Dec. 4, 2020 and titled FILTERING GROUP INCLUDING A SPHERICAL VALVE. The content of these applications is incorporated herein by reference except for where they conflict with the content herein.

FIELD OF THE ART

The present invention relates to a filtering group for fluidic systems, such as, for example, thermo-technical systems, such as heating systems.

STATE OF THE ART

Filtering assemblies installed along hydraulic system piping and comprising magnetic filters and mesh filters arranged to collect impurities present in the fluid affecting the system are known. The filtering is useful to prevent ferrous or mineral particles from damaging system components such as, for example, pumps or boilers.

Document IT-A-102016000025513 describes a ball valve having a valve body, which houses a ball shutter, and three threaded connections. In addition, there is provided a bushing, screwed inside a first port used as a fluid inlet, so as to be in contact with the ball valve plug. A second connection, aligned with the inlet one, is fixed to a container which houses permanent magnets for the purpose of filtering the fluid. A third connection, orthogonal to the inlet one, is such as to be connected to a fluid outlet pipe.

SUMMARY OF THE INVENTION

Applicant has noted that filtering assemblies of the known art provided with flow shutoff valves are not, however, satisfactory with respect to the possibility of their connection to fluidic systems having different conditions of space available for installation of the filtering group or relative orientation of the fluid supply and outlet piping.

The technical problem addressed by the present invention is to provide a filtering group, of the type comprising a ball valve, that offers flexibility of installation and that is, can be installed in systems that present different conditions of available space and orientation of the piping to which the filtering group is to be connected.

In particular, it is an object of the present invention to provide a filtering group and particular embodiments thereof as described herein.

BRIEF DESCRIPTION OF THE FIGURES

The constructive and functional characteristics of the invention may be better understood from the detailed description that follows, in which reference is made to the attached drawing plates representing some preferred and non-limiting embodiments thereof, wherein.

DETAILED DESCRIPTION

Figure 1:
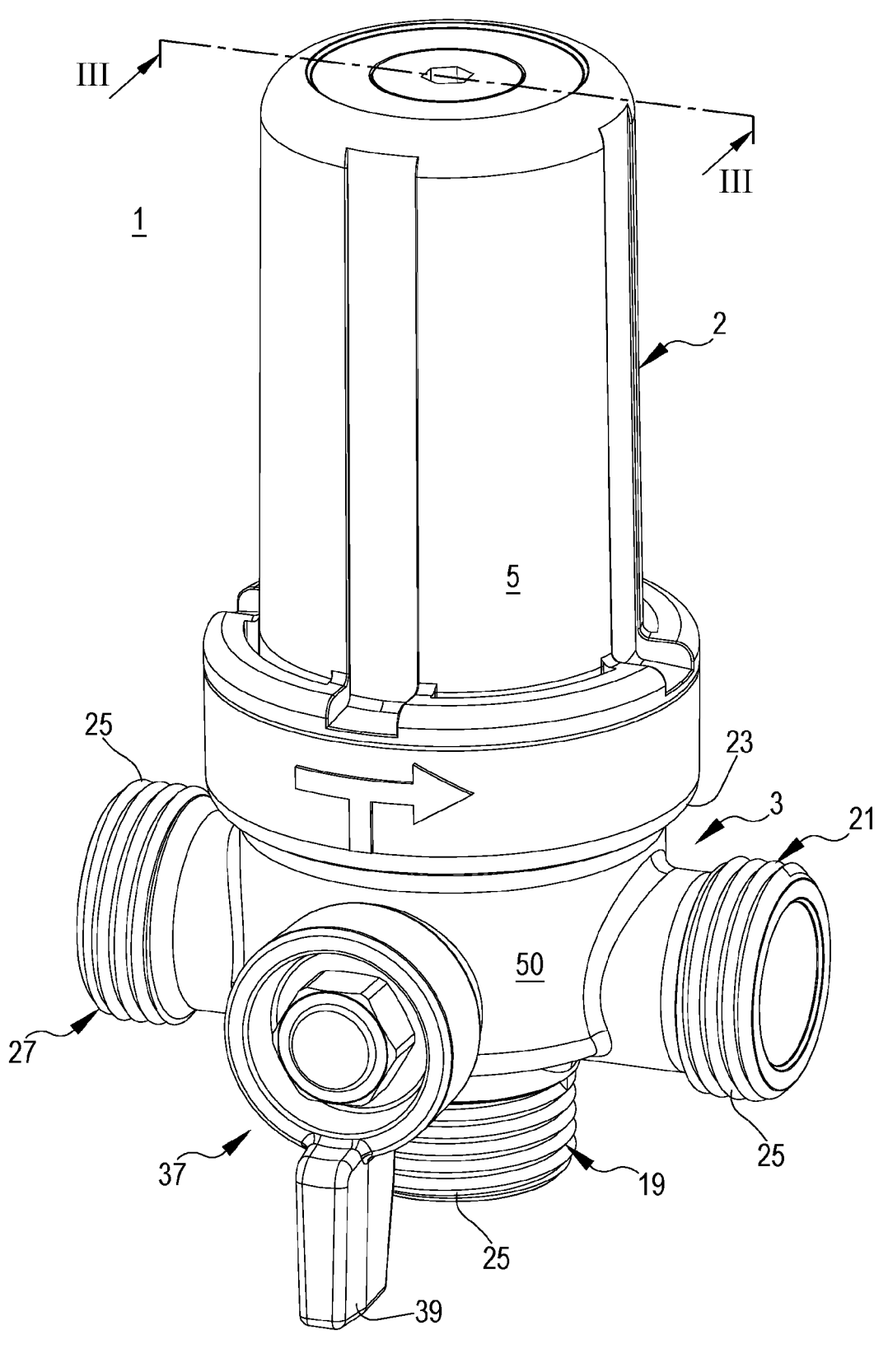
FIG. 1 shows a perspective view of an example of a filtering group comprising a connecting structure, with couplings, and a filter body.

As illustrated in FIG. 1, the filtering group 1 includes a filter body 2 and a connection structure 3, which is configured to be connected to a fluidic system (e.g., thermo-technical systems, such as heating, cooling systems). In particular, the filtering group 1 is intended to be used to protect pumps, boilers or other apparatus, in order to protect them from impurities that may be in the fluid circulating in the system.

With reference also to FIGS. 2-5, the filter body 2 (of a watertight type) defines an internal cavity 4 (FIGS. 3 and 5) and is delimited by perimeter walls 5. In greater detail, the filter body 2 (for example, of a substantially cylindrical type outline) includes, in correspondence to a first end 7 (FIG. 2), a connection opening 6 having, for example, an external thread 8, of screwing to the connection structure 3. According to a particular embodiment, the first end 7 is a collar extending outside the volume defined by the perimeter walls 5 of the filter body 2.

According to one example (FIGS. 3 and 5), the filter body 2 includes a case 9 (cylindrical in shape) which extends into the inner cavity 4 (for at least part of its length) and is such as to accommodate (advantageously, removably) a magnetic filter element 10. The housing 9 is provided with an insertion opening 13 (FIG. 2), which is present on a wall of the filter housing 2 opposite to the connection opening 6, and is provided with a corresponding thread. According to the example, the housing 9 is closed, i.e., without any openings, to the inner cavity 4.

Figure 2:
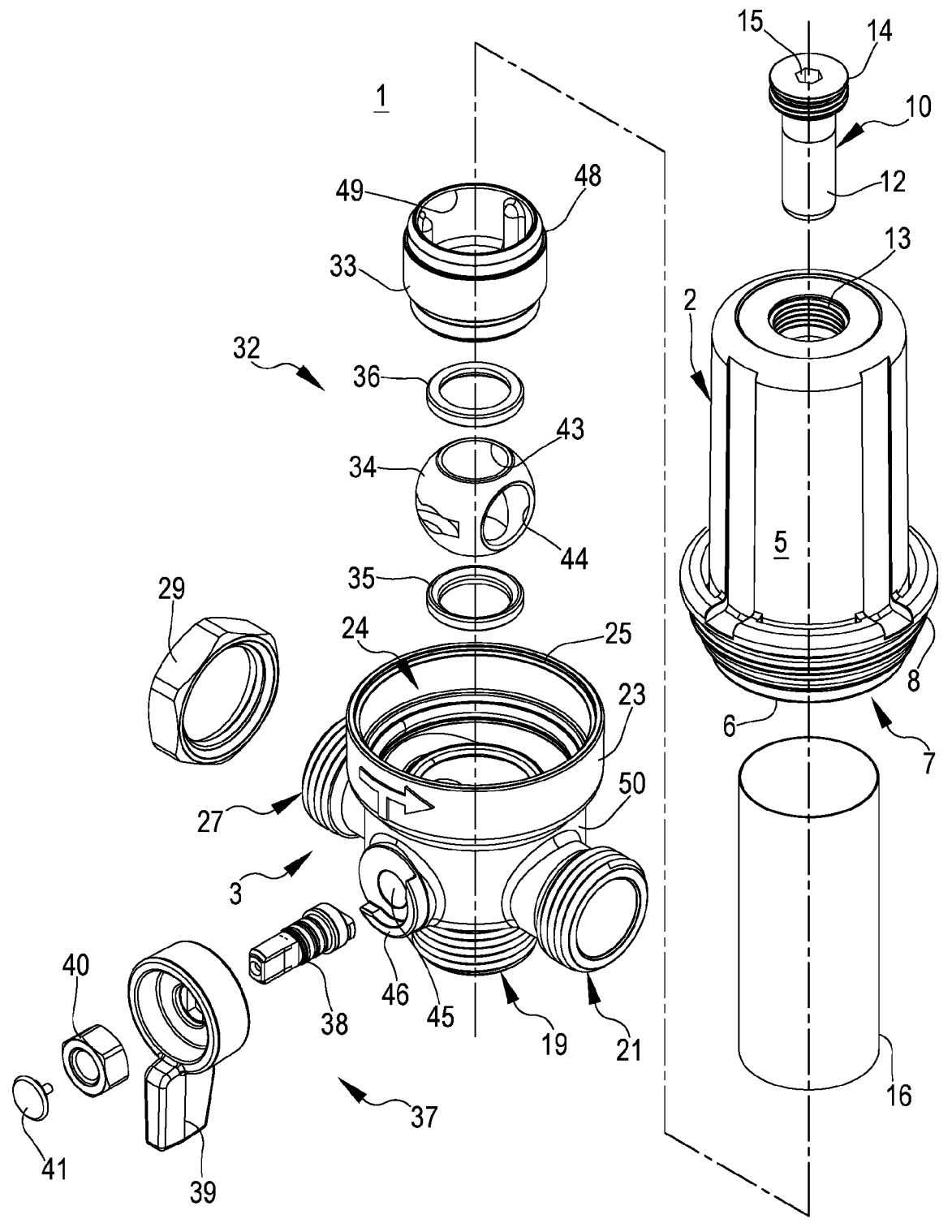
FIG. 2 shows an exploded view of said filter unit, also including a ball valve.
Figure 3:
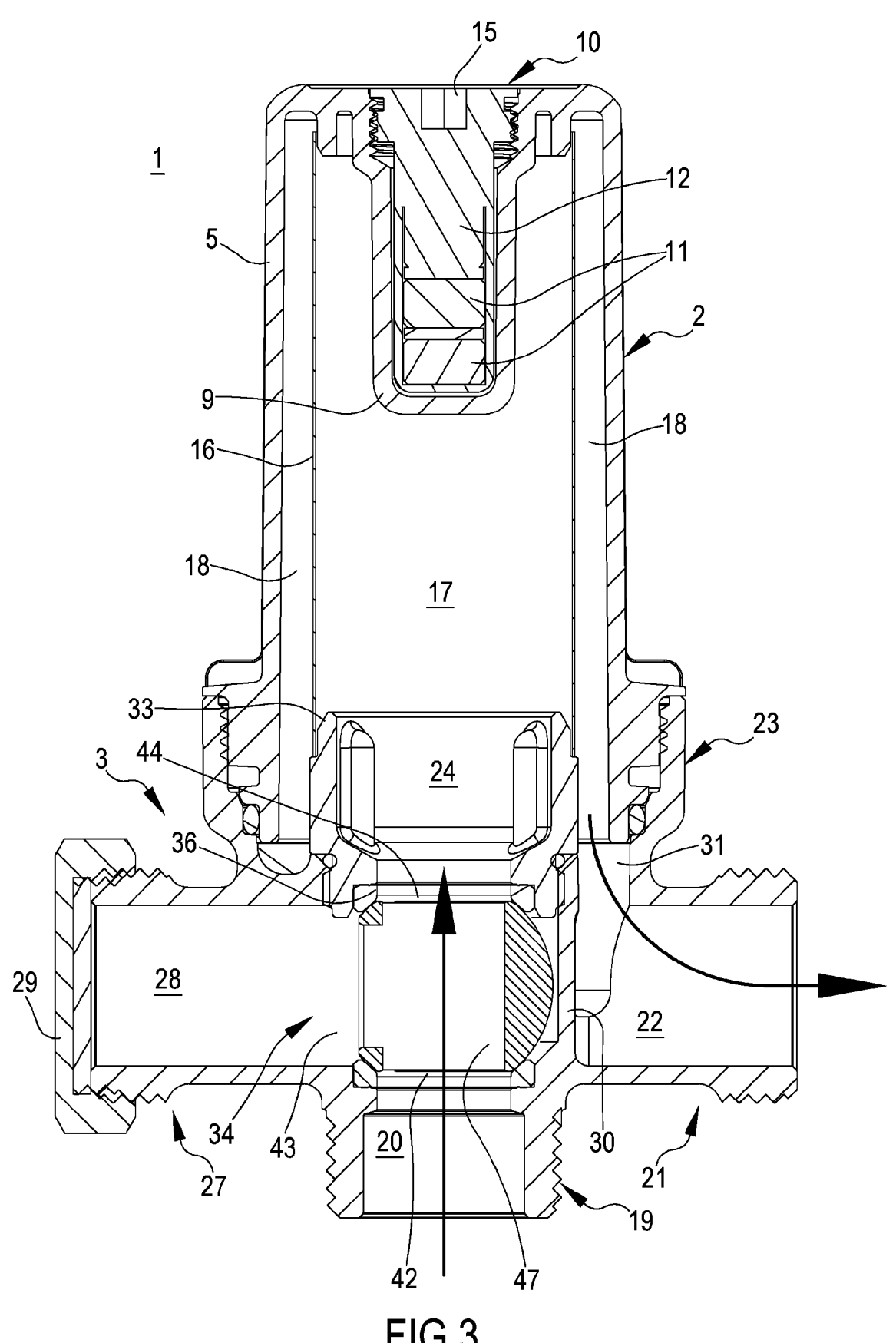
FIG. 3 shows a section of said filter unit according to the plan section of FIG. 1, in a first operating mode and in an open condition.

According to the described embodiment, the magnetic filtering element 10 comprises a capsule 12 to be inserted into the case 9, which houses at least one permanent magnet 11 (FIGS. 2 and 3). The magnetic filtering element 10 allows, by magnetic attraction, the filtering of metal or metal-containing particles present in the fluid circulating in the inner cavity 4. The capsule 12 is provided, for example, with a threaded head 14 having a recess 15, so that it can be screwed and unscrewed from the housing 9 for maintenance or replacement operations.

According to a particular embodiment, the filter body 2 is also provided with a mesh filter 16, having a substantially cylindrical shape, which extends in the direction of the length of the filter body 2, surrounding the magnetic filtering element 10.

In addition to having a filtering effect due to its mesh, the mesh filter 16 defines a filter chamber 17, which is internal to the mesh filter itself, and an annular chamber 18, which is external to the mesh filter 16. For example, the mesh filter 16 may have mesh apertures having widths and lengths of less than 800.00 μm, for example between 700.00 μm and 500.00 μm.

Advantageously, the walls 5 of the filter housing 2 may be, in whole or in part, transparent so as to allow the accumulation of filtered particles to be observed from the outside and to decide on the need for maintenance. In addition, the walls 5 of the filter body 2 may include manual gripping elements for screwing/unscrewing the filter body itself such as, for example, grooves, protrusions or a ring nut.

The connection structure 3 includes a filter fitting 23 that defines a corresponding conduit 24 and is such that it is mechanically connected to the filter body 2. In particular, the filter fitting 23 has a corresponding thread 25 (FIG. 2) that allows tight screwing of the first end 7 of the filter body 2, placing the conduit 24 in fluid communication with the filter chamber 17 included in the inner chamber 4 of the filter body 2.

Further, the connection structure 3 includes a first input coupling 19 defining a first input conduit 20 (FIGS. 3 and 4) and an output coupling 21 defining an output conduit 22. According to the embodiment form of the figures, the first input coupling 19 and the output coupling 21 are oriented according to mutually perpendicular directions, and the first input coupling 19 is aligned with the filter fitting 23, along the longitudinal axis of the filter body 2.

The connection structure 3 further includes an inner chamber 26 that results in fluid connection with the conduit 24 of the filter fitting 23 and the first input conduit 20 of the first input coupling 19.

The output conduit 22 of the output coupling 21 is separated from the chamber 26 by a partition or septum 30 and is, instead, in fluid connection with the annular chamber 18 by an output conduit 31, formed by passages/spaces, present in the connection structure 3.

The first input coupling 19 and the output coupling 21 are provided, on their relative ends opposite those connected to the inner chamber 26, with relative threads 25 for screwing to piping of the external fluidic system.

Further, the connection structure 3 includes a second input coupling 27 defining a relative second input conduit 28 in fluid communication with the inner chamber 26 and provided, for example, with a corresponding thread 25 for screwing to an external fluid supply piping. The second input coupling 27 is oriented, with respect to the longitudinal axis of the filter body 2, differently from the first input coupling 19 and is, in particular, perpendicular to said longitudinal axis and aligned with the output coupling 21.

The second input coupling 27 is alternatively usable with the first input coupling 19. Having two alternatively usable input couplings 19 and 27 allows the user positioning the filtering group 1 in the appropriate operating position for various possible orientations of the fluidic system piping to which the filtering group itself is to be connected.

It should be noted that, preferably, the first input coupling 19, the second input coupling 27, the filter fitting 23 and the output coupling 21 are tubular type elements, attached to a support body 50 (forming part of the interconnection structure 3), which internally defines the inner chamber 26.

Advantageously, the interconnection structure 3 is fabricated (e.g., of metallic material, such as brass, or plastic) in one piece, so that there are no joints (such as, soldering or screw threads) that may cause fluid to leak to the outside. For example, the connection structure 3 is obtained by machining a single block of the selected material. In particular, the first input coupling 19, the second input coupling 27, the filter fitting 23, and the output coupling 21 are in one piece with the support body 50.

Notably, the filtering group 1 further includes a closure element or cap 29 (FIG. 1) to be affixed (e.g., by screwing) to one of the input couplings 19 or 27 that is not connected to the fluid supply piping.

Note that the connection structure 3 is also configured to include a flow shutoff ball valve 32 that, in particular, is received in the inner chamber 26 of the connection structure 3. Specifically, the ball valve 32 includes a locking sleeve 33, a ball shutter 34, a first seal 35, and a second seal 36 (FIG. 2).

For example, the locking sleeve 33 has an outline of a hollow cylinder with relative openings 47 at the bases. The clamping sleeve 33 has, on the relative outer wall, a stop edge 48 (e.g., annular) and a thread and, internally, ribs to allow it to be screwed together. The first gasket 35 and the second gasket 36 are, for example, gaskets made of molded plastic material (in particular, polytetrafluoroethylene PTFE).

In addition, the connection structure 3 includes an actuating device 37 including a stem or rod 38 that, at one end, is interlockingly coupled to the ball shutter 34 while at another end is connected to an actuating knob 39 (e.g., lever, as in the figures, or butterfly) or an actuating motor that allows the ball shutter 34 to rotate. For example, the knob 39 is attached to the stem 38 by a nut 40 and a screw 41. The connection structure 3 has an insertion hole 45 for the stem 38, whose rotation about its axis is limited by a stop guide 46.

The ball shutter 34 is internally hollow and has a first hole 42 (FIG. 8), a second hole 43, and a third hole 44; these holes connect the exterior with the interior of the ball shutter 34. For example, the first hole 42 and the third hole 44 are arranged along one and the same axis; the second hole 43 is arranged along an axis perpendicular to the axis of the first hole 42 and the third hole 44. With respect to assembly, the stem 38 is introduced into the connection structure 3 through the opening of the filter fitting 23 in and out of the insertion hole 45. Further, the valve 32 is assembled by introducing its components into the connection structure 3 through the opening of the filter fitting 23. According to one example, the first seal 35 is placed in a relative seat of the inner chamber 26 and then the ball poppet 34 is inserted into the same chamber 26, in contact with the first seal 35 and so that it mechanically mates with the stem 38.

Note that the filter fitting 23 is sized so that the conduit 24, which is open to the inner chamber 26, allows for the (e.g., manual) insertion of the ball shutter 34 and locking sleeve 33 through an opening in the filter fitting itself.

The second gasket 36 is then introduced into a respective seat of the inner chamber 26 so that it is in contact with the ball shutter 34, and then the locking sleeve 33 is placed over the ball shutter 34 by screwing it internally into the conduit 24 defined by the filter fitting 23. The openings 47 of the locking sleeve 33 are aligned with the conduit 24.

Then, the first end 7 of the filter body 2 is inserted, by screwing, into the filter fitting 23 so that the conduit 24 faces the filter chamber 17. For example, in screwing in, the mesh filter 16 is brought into contact with the annular edge 48 of the locking sleeve 33.

With respect to operation, it should be noted that the filtering group 1 may be operated in accordance with a first mode of operation, by screwing the cap 29 to the second input coupling 27, or in accordance with a second mode of operation, by screwing the cap 29 to the first input connection 19.

Figure 5:
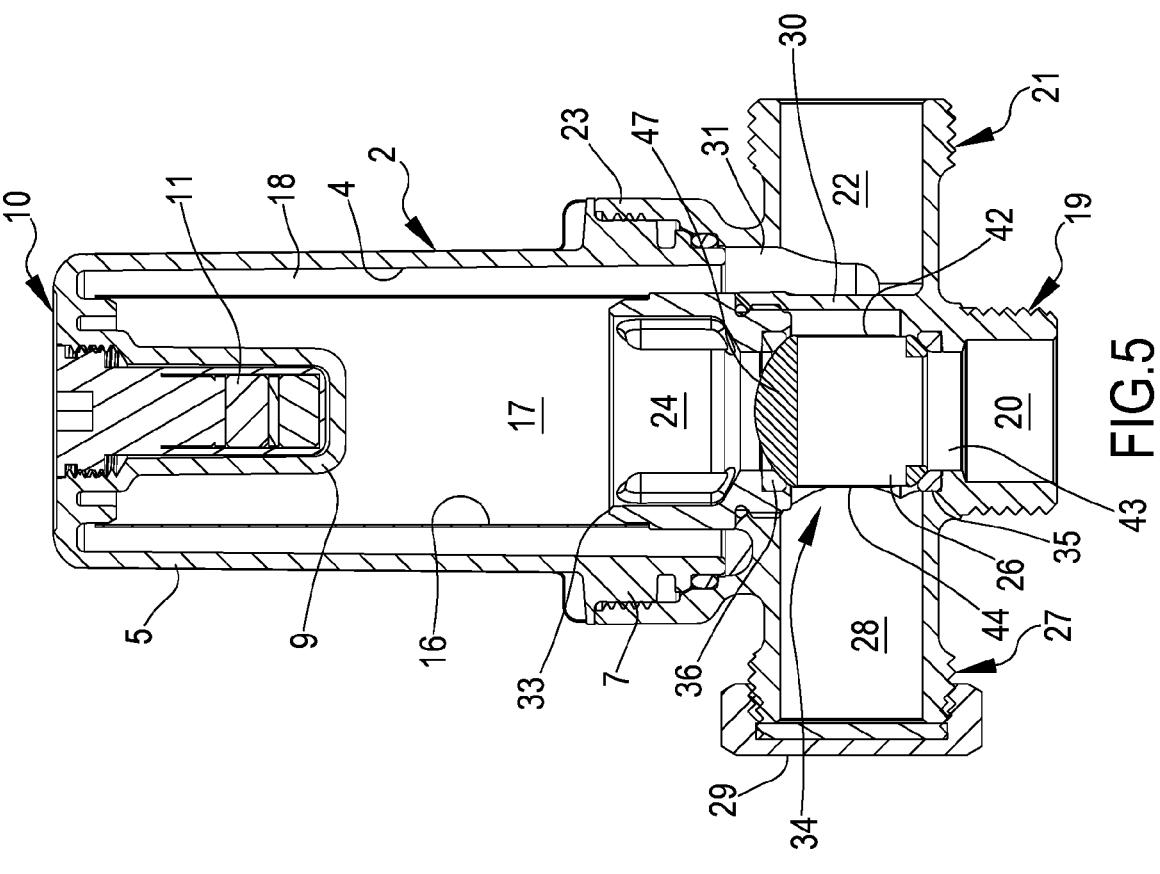
FIG. 5 shows a cross-section of said filter unit according to the sectional plane V-V of FIG. 4, in the first operating mode and in an open condition.
Figure 4:
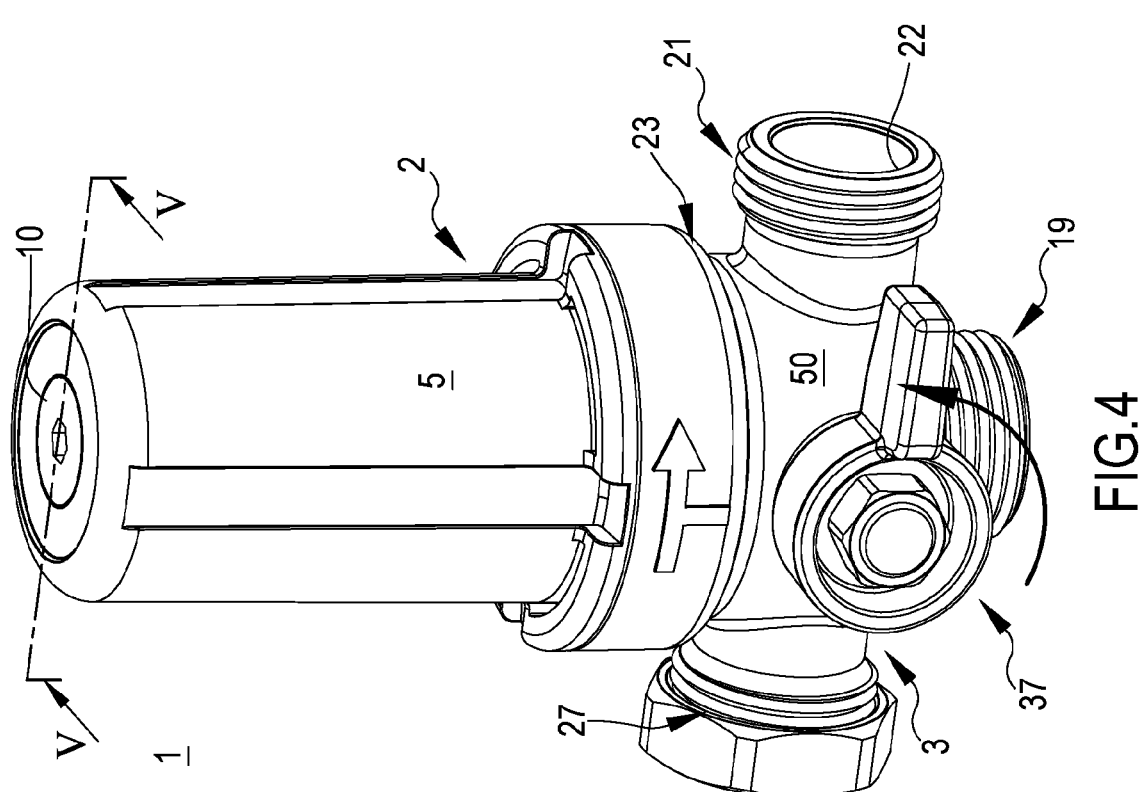
FIG. 4 shows a perspective view of said filter unit, in the first operating mode and in a closed condition.

The first mode of operation (cap 29 screwed onto second input coupling 27) is shown in FIGS. 3-5. In this first mode of operation, the first input coupling 19 is connected to the supply piping and the output coupling 21 is connected to a plant outlet piping.

In greater detail, FIG. 3 relates to an opening configuration in which the position of the plug 34 allows fluid entering from the first input conduit 20 to flow into the plug itself through the first bore 42 and then exit through the third bore 44, thereby entering the conduit 24 and the filter chamber 17. A solid portion 47 of the plug 34 is facing the septum 30.

In the filter chamber 17, the fluid is subjected to the action of the magnetic filtering element 10, which retains ferrous impurities, and also, by invading the annular chamber 18 through a crossing of the mesh filter 16, undergoes further filtering. Thus, the fluid, from the annular chamber 18, enters the output conduit 22 of the output coupling 21, crossing the output conduit 31, thereby entering the outlet piping of the fluidic system.

Still with reference to the first mode of operation (use of the first input coupling 19), it is possible to switch the valve 32 to a closed position (FIGS. 4 and 5) by rotating the knob 39 (for example, 90° counterclockwise) so that the third hole 44 of the ball shutter 34 faces the second input conduit 28 (on which the plug 29 is present) and the solid portion 47 is aligned with the conduit 24, plugging it, preventing fluid from entering the filter body 2 and the output conduit 22.

Figures 6, 7, 8:
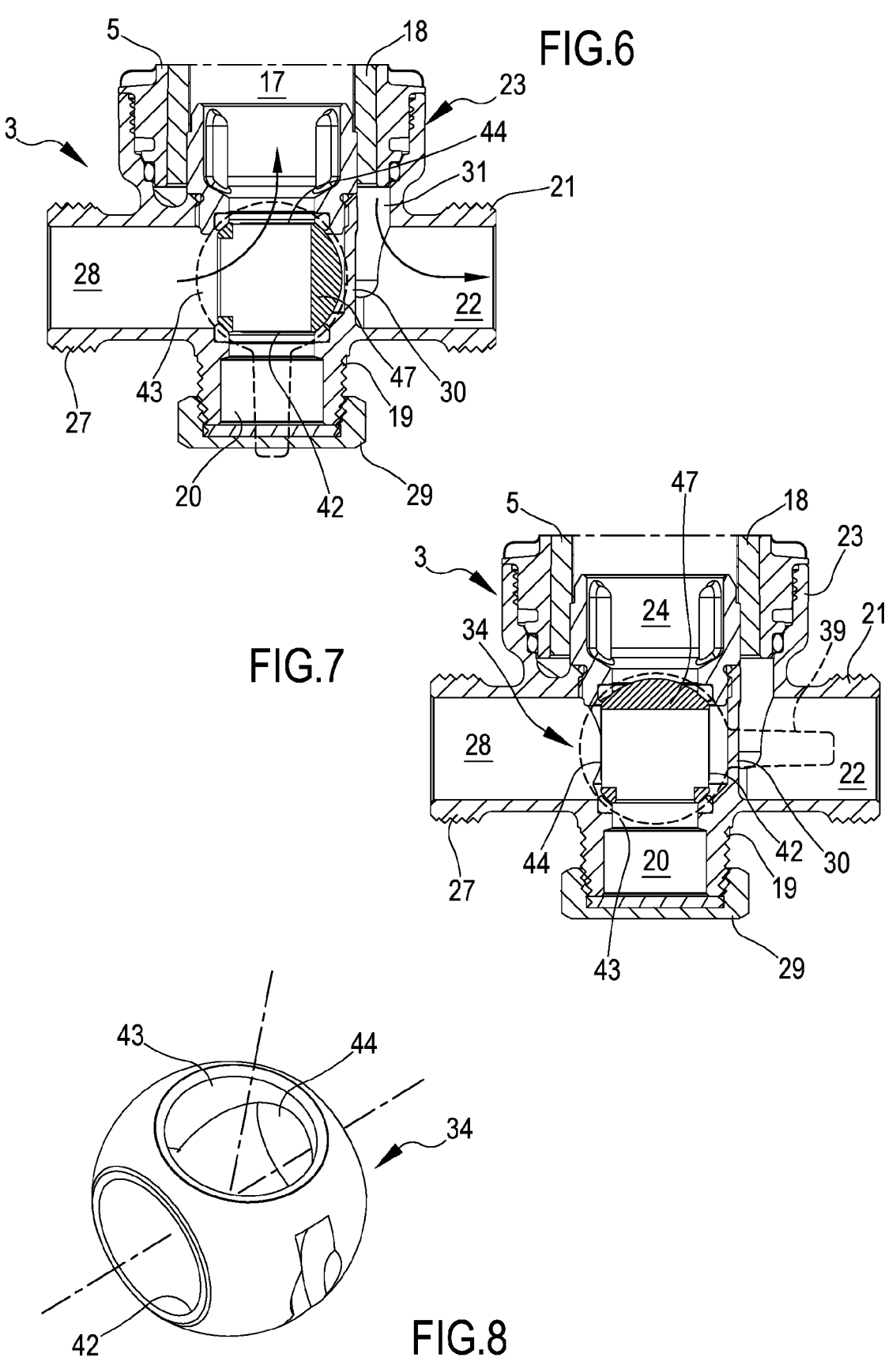
FIG. 6 shows, in section, a portion of said filter unit, in a second operating mode and in an open condition.
FIG. 7 shows, in section, a portion of said filter unit, in the second operating mode and in a closed condition.
FIG. 8 shows in perspective view an example of spherical shutter of said valve.

With reference to FIGS. 6 and 7, consider the second mode of operation (cap 29 screwed to first input coupling 19), wherein the second input coupling 27 is connected to the supply piping, and the output coupling 21 is connected to the system outlet piping. In a closure configuration (FIG. 7), the ball shutter 34 is oriented such that a full portion 47 of the ball shutter faces the conduit 24, in a manner identical to that described for the first mode of operation.

Turning the knob 39 (e.g., 90° clockwise) achieves an opening position depicted in FIG. 6) wherein the second bore 43 of the ball shutter 34 is facing the second input conduit 28 (of the second input coupling 27) and the first bore 42 is aligned with the conduit 24. The solid portion 47 of the ball shutter 34 is facing the septum 30.

In such an opening configuration, fluid from the supply piping entering the second input conduit 28 flows into the second bore 43 of the ball shutter 34 and exits the third bore 44, reaching the conduit 24 of the filter fitting 23.

The fluid, similarly to that described with reference to the first mode, from the filter chamber 17, where both the magnetic filter element 10 and the mesh filter 16 act, invades the annular chamber 18, the discharge conduit 31 and exits the output conduit 22.

Note that the position of the ball shutter 34 assumed in the opening configuration (FIG. 3) of the first operating mode coincides with the opening configuration (FIG. 6) of the second operating mode.

Similarly, the position of the ball shutter 34 assumed in the closed configuration (FIG. 5) of the first mode of operation coincides with the closed configuration (FIG. 7) of the second mode of operation.

Both in the case of using the first input coupling 19 and, alternatively, in the case of using the second input coupling 27, in the closed position it is possible to remove the filter body 2 from the connection structure 3 to perform cleaning operations of the internal cavity 4 or to remove the mesh filter 16 and/or the magnetic filter element 10, for the purpose of replacement or cleaning.

According to a particular embodiment, that inlet couplings (19 or 27) that is not connected to the supply conduit may be used to introduce a chemical (such as an additive or descaler) into the system. This can be achieved by a suitably shaped container inserted, in place of the cap 29, the that input fitting that is free so that it releases the chemical of interest into the fluid flowing through the connection structure 3.

It should be noted that the filtering group 1, provided with the connection structure 3 as described, is extremely advantageous in that it can be properly mounted in fluidic systems with input and outlet piping having different possible orientations. In fact, depending on the type of system and the available spaces, the operator may decide to use the first input connection 19 or the second input coupling 27 as the input of the filtering group 1, also ensuring the functionality of the filter.

The presence of the ball valve 32 integrated in the connection structure 3 allows to intercept the flow of fluid allowing, inter alia, the maintenance and cleaning operations of the filter.

Moreover, the connection structure 3, made in one piece, allows to avoid fluid losses towards the outside, since it does not have joints among its components, while allowing the introduction of the ball valve 32, having the plug 34 blocked by the sleeve 33.

The filtering group 1 including the connection structure 3, with two inlets, having the ball valve 32 integrated, is also advantageous due to its compactness.

LIST OF COMPONENTS SHOWN IN THE FIGURES filter group 1
filter body 2
connection structure 3
internal cavity 4
perimeter walls 5
connection opening 6
first end 7
external thread 8
case 9
magnetic filter element 10
permanent magnet 11
capsule 12
insertion opening 13
threaded head 14
recessed 15
mesh filter 16
filter chamber 17
annular chamber 18
first input coupling 19
first input conduit 20
output coupling 21
output conduit 22
filter fitting 23
conduit 24
thread 25
inner chamber 26
second input coupling 27
second input conduit 28
closing element 29
septum 30
exhaust duct 31
valve 32 locking sleeve 33
ball shutter 34
first seal 35
second seal 36
actuating device 37
stem 38
actuation knob 39
nut 40
screw 41
first hole 42
second hole 43
third hole 44
insertion hole 45
stop crown 46
solid portion 47
edge 48
opening 49
supporting body 50

The invention claimed is:

1. A filtering group comprising:
a connection structure having a first input coupling to be placed in communication with a supply conduit of an external fluidic system, and an output coupling to be placed in communication with an output conduit of the external fluidic system, wherein the first input coupling is oriented with respect to the output coupling according to a first orientation;
a filter body connected to the connection structure and in fluid communication with the output coupling, wherein the filter body is configured to retain particles present in fluid flowing through the filter body;
a ball valve housed in the connection structure to assume a first position in which the first input coupling is placed in fluid communication with the filter body, and a second position in which fluid communication between the first input coupling and the filter body is interdicted;
wherein the connection structure includes a second input coupling to be placed in communication with the supply conduit as an alternative to the first input coupling and oriented, with respect to the output coupling, in accordance with a second orientation, different from the first orientation;
wherein the ball valve is configured so that in the first position the second input coupling is placed in fluid communication with the filter body; and
wherein the ball valve is configured so that in the second position the fluid communication between the second input coupling and the filter body is interdicted.

2. The filtering group according to claim 1, wherein the connection structure further comprises:
a filter fitting in fluid communication with an access opening of the filter body; and
an inner chamber in fluid communication with at least one of the first input coupling, the second input coupling, and the filter fitting.

3. The filtering group according to claim 2, wherein the connection structure is one monolithic piece, wherein the ball valve comprises a ball shutter housed in said inner chamber, and a blocking sleeve housed in the filter fitting and in contact with the ball shutter to keep it in an operating position.

4. The filtering group according to claim 3, wherein the filter fitting defines a conduit open on said inner chamber dimensioned to allow insertion of the ball shutter and the blocking sleeve through said conduit.

5. The filtering group according to claim 1, further comprising a closing element selectively applicable to the first input coupling and the second input coupling.

6. The filter group according to claim 1, wherein the filter body is fixed to the connection structure in a removable manner to allow maintenance operations.

7. The filter group according to claim 1, further comprising an actuating device connected to the ball valve for selectively bringing it in the first and second positions.

8. The filtering group according to claim 5, wherein said filter body further comprises a housing that removably houses a magnetic filter element that comprises at least one magnet to attract metal particles present in the fluid.

9. The filtering group according to claim 8, wherein said filter body defines an inner chamber that comprises:
a mesh filter having a cylindrical shape and such as to define internally a filter chamber within which the housing of the magnetic filter element extends and such as to result in fluid communication with the conduit of the filter fitting;
wherein the mesh filter externally defines an annular chamber inside the filter body configured to be invaded by the fluid exiting from the supply conduit and crossing the mesh filter; and
wherein the annular chamber is in fluid communication with the output coupling.

10. The filtering group according to claim 3, wherein the inner chamber and the output coupling are separated by a septum.

11. The filtering group according to claim 10, wherein the ball shutter is internally hollow and comprises a first hole, a second hole and a third hole and a solid portion; wherein in the first position the first hole faces the first input coupling, the second hole faces the second input coupling, the third hole faces the conduit, and the solid portion faces said septum; wherein in the second position the solid portion faces the conduit inhibiting the fluid flow in the filter body, the first hole faces the septum, the second hole faces the first input coupling, and the third hole faces the second input coupling.

12. The filtering group according to claim 1, wherein the external fluidic system comprises at least one of a hydraulic heating system, a thermo-technical system, a heating system, a cooling system, a pump, and a boiler.

13. The filtering group according to claim 1, further comprising a container of a chemical product to be inserted into at least one of the first input coupling and second input coupling to cause a release of the chemical product into the fluid flowing through the connection structure.

\* \* \* \* \*